Dec. 24, 1968   J. B. RATELBAND   3,417,778
CHECK VALVE WITH RESILIENT SEAT MEANS
Original Filed Dec. 4, 1964

INVENTOR

JOHANNES B. RATELBAND

BY *Imirie & Smiley*

ATTORNEYS

United States Patent Office 3,417,778
Patented Dec. 24, 1968

3,417,778
CHECK VALVE WITH RESILIENT SEAT MEANS
Johannes B. Ratelband, Zutfensestraatweg Velp 44, Velp, Netherlands
Continuation of application Ser. No. 415,927, Dec. 4, 1964. This application Oct. 5, 1967, Ser. No. 673,235
2 Claims. (Cl. 137—543.23)

ABSTRACT OF THE DISCLOSURE

A check valve having a valve seat in the form of a thin, annular, resilient lip, and a valve member having a rounded body with a diameter increasing in the direction remote from the valve seat and engageable with said lip substantially at its maximum diameter. An abutment is provided in the casing upstream from the valve seat lip, and the valve body has guide means extending into the valve seat element and engageable with said abutment to limit engagement pressure by the valve body on the valve seat lip. Under fluid pressure, the lip is subject to expansion from the valve body to reduce resistance to retractive movement by the body.

Summary of invention

This application is a continuation of Ser. No. 415,927, filed Dec. 4, 1964, now abandoned.

The invention has for its objects to reduce the resistance which the valve body opposes to the flow of fluid. According to to the invention the seat for cooperation with the valve body consists of a sleeve-like diaphragm of elastic material secured in the casing at the inlet side and surrounds the valve body which at its part facing the inlet side has a diameter increasing in the direction towards the outlet side and the sleeve-like diaphragm in closed position of the valve body bears with its free end on the part of the valve body where the diameter of the body is increasing or has its maximum value. With said construction of the valve not only the valve body is axially urged from its seat by the pressure of fluid at the inlet side of the casing but also the sleeve-like diaphragm is urged away from the valve body so that the valve body at a certain pressure of fluid at the inlet side leaves a relatively large passage area for the fluid flowing through the valve.

Brief description of drawing

The invention will be further described with reference to the accompanying drawing showing an embodiment of the check-valve according to the invention.

In the drawing

Detailed description of invention

Figure 1:
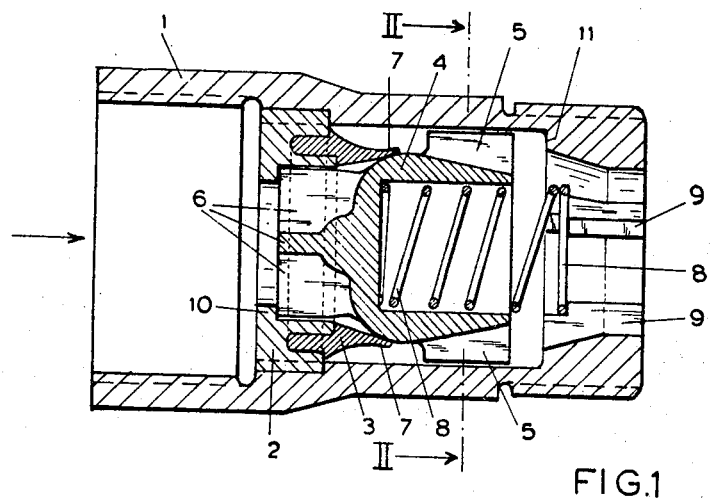
FIG. 1 is a longitudinal sectional view of the valve taken on line I—I of FIG. 2, which itself is a cross section taken on line II—II of FIG. 1.
Figure 2:
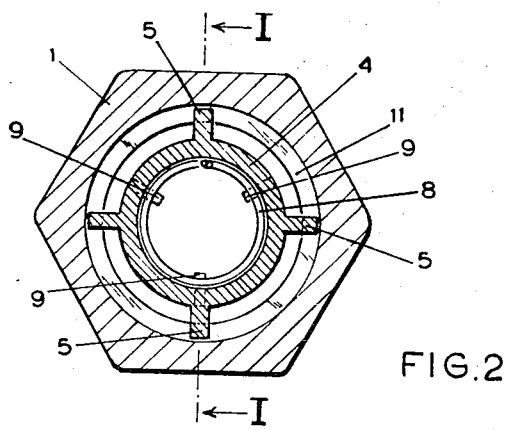

The cylindrical casing 1 consists of one piece and has at the inlet end interval screw thread and at the outlet end external screw thread for the connecting conduits. Into the casing 1 a ring 2 is threaded having an annular groove in which an elastic sleeve-like diaphragm 3 is secured e.g. by vulcanisation. A bowl-shaped valve body 4 by means of fins 5 is guided in the casing 1 and by means of fins 6 in the ring 2. The diaphragm 3 consists of rubber or like elastic material and terminates in a thin annular lip 7 with which the diaphragm in closed position of the valve body bears on the circumference of the body at that part of the body, where the diameter of the body is increasing or has its maximum value.

A spring 8 located in the cavity of the valve body is bearing on the ribs 9 at the outlet end of the casing and is urging the valve body in its closed position. Said displacement of the valve body to its closed position is limited by the fins 6 abutting against a collar 10 at the inner side of the ring 2. The opposite movement of the valve body is limited by the shoulder 11 at inner wall of the outlet end of the casing.

The fins 5 and/or 6 of the valve body may be helically shaped, so that the valve during its axial movement obtains a rotation. By said rotation a scraping action at the inner wall of the casing and/or at the inner side of the ring 2 is obtained.

The abutment 10 at the inner side of the ring 2 may be replaced by a rod extending transversely in the casing and to which a tension spring secured to the valve body and replacing spring 8 may be connected.

The fins 5 and 8 for guiding the valve body may be replaced by a central journal secured to the valve body and guided in the casing.

I claim:
1. In a check valve which includes a casing having a valve seat element therein and a valve member within said casing and spring urged toward the seat, the improvement in the valve seat element which comprises:
    a tubular sleeve-like element of resilient material terminating in a thin, annular even lip;
    said lip constituting the sole valve seat and being radially expandable under fluid pressure;
    said valve member comprising a rounded body having a diameter increasing in the direction remote from the valve seat element and engageable with the inner annular surface of the valve seat lip substantially at its maximum diameter;
    said valve member in closed position with the valve body bearing uniformly on the valve seat lip, flexing the lip radially outwardly whereby said valve body is yieldingly received within the thin portion of said tubular element and cooperates with said tubular element in defining a tapered annular entry for fluid under pressure between said lip and valve body, so that said lip is subject to radial expansion from said valve body to reduce resistance to retractive movement by the valve body;
    said valve member also comprising a portion extending upstream of said valve body but permitting normal fluid access to said tapered annular entry; and
    an abutment in said casing upstream of said valve seat lip and engageable by said extending portion to limit movement of said valve body into said tubular element and lip.
2. In a check valve according to claim 1, said upstream extending portion of said valve member comprising guide means cooperative with said casing.

References Cited

UNITED STATES PATENTS

| 245,904 | 8/1881 | Wiley | 137—533.17 X |
|---|---|---|---|
| 257,088 | 4/1882 | Shepard | 137—533.17 X |
| 1,100,219 | 6/1914 | Butters | 137—533.15 X |
| 1,252,411 | 1/1918 | Dickinson | 251—333 |
| 2,233,649 | 3/1941 | Stahl et al. | 137—533.31 X |
| 2,640,677 | 6/1953 | Craven | 137—533.23 X |
| 2,717,112 | 9/1955 | Ralston | 251—333 X |
| 2,916,042 | 12/1959 | Brady | 137—533.15 X |

FOREIGN PATENTS 855,956  12/1960  Great Britain.

ALAN COHAN, *Primary Examiner.*

D. LAMBERT, *Assistant Examiner.*

U.S. Cl. X.R.
251—333